April 28, 1925.
H. W. STERTZBACH
CAR COUPLING DEVICE
Original Filed March 22, 1923
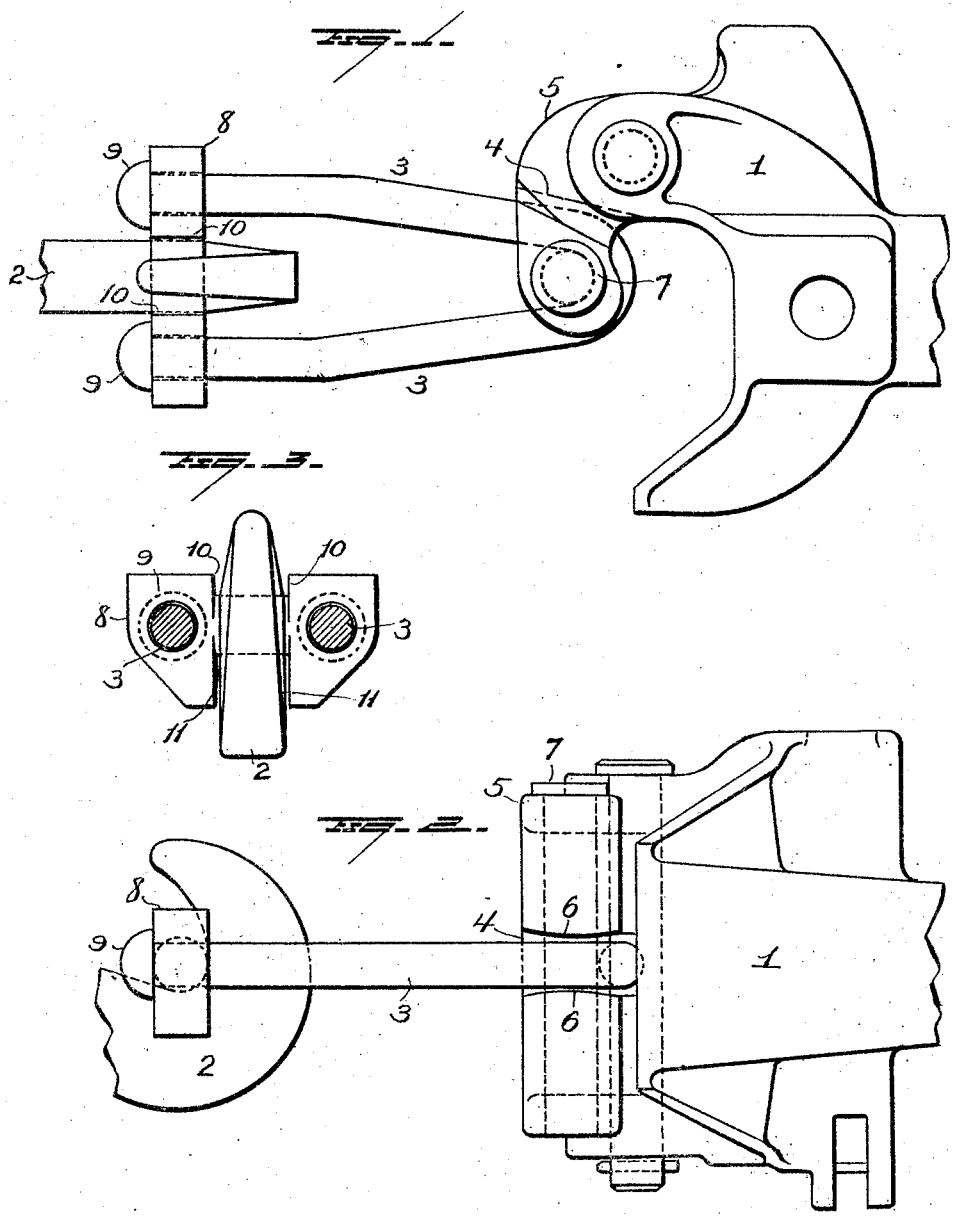

Patented Apr. 28, 1925.

1,535,959

UNITED STATES PATENT OFFICE.

HARRY WALTER STERTZBACH, OF COLUMBUS, OHIO, ASSIGNOR TO THE BUCKEYE STEEL CASTINGS COMPANY, OF COLUMBUS, OHIO.

CAR-COUPLING DEVICE.

Original application filed March 22, 1923, Serial No. 626,934. Divided and this application filed November 5, 1923. Serial No. 672,838.

*To all whom it may concern:*

Be it known that I, HARRY W. STERTZBACH, a citizen of the United States, and resident of Columbus, in the county of Franklin and State of Ohio, have invented certain new and useful Improvements in Car-Coupling Devices; and I do hereby declare the following to be a full, clear, and exact description of the invention, such as will enable others skilled in the art to which it appertains to make and use the same.

This invention relates to improvements in car coupling devices, this application being a division of application for patent filed by J. C. Whitridge, G. T. Johnson, H. W. Stertzbach and H. H. Wolfe March 22, 1923 and designated by Serial No. 626,934.

An object of the present invention is to provide simple and efficient connecting devices between an M. C. B. automatic car coupling and a coupler of the hook type, which shall be flexible and not interfere with the buffing action when the cars come together.

With this and other objects in view, the invention consists in certain novel features of construction and combinations of parts as hereinafter set forth and pointed out in the claims.

In the accompanying drawings:—

Figure 1 is a plan view showing an embodiment of my invention;

Figure 2 is a side elevation of the structure shown in Figure 1, and

Figure 3 is a view on the line 3—3 of Figure 1.

In the drawings, an M. C. B. automatic coupling is represented at 1 and a coupler of the hook type is indicated at 2.

The connecting devices between these two types of couplings includes a U-bolt or link 3 which enters a slot 4 in the knuckle 5 of the automatic coupling and the upper and lower walls of said slot are made curved as at 6. The knuckle is made near its free end with a vertical hole which intersects the slot 4 and through this hole and the U-bolt or link 3, a pin 7 is passed.

The free ends of the U-bolt arms are inserted through suitable holes near respective ends of a yoke or bridge 8 and then upset to form heads 9. The yoke or bridge 8 consists of a bar inserted between the body and bill of the hook coupling 2, and is made with notches in its upper and lower edges in its central portion forming a reduced intermediate portion and providing stops 10 and 11 to engage the sides of the body and bill of the hook and prevent transverse movement of the yoke.

When the cars come together, the U-bolt will slide past the pin 7 into the hollow body of the M. C. B. drawhead, while the inner wall of the hook coupling tends to slide the yoke forwardly on the U-bolt without jamming any of the parts.

Having fully described my invention what I claim as new and desire to secure by Letters-Patent, is:—

1. In a device of the class described, the combination of a hook coupler, an automatic coupler including a knuckle and a pin mounted vertically in the free end portion of the knuckle, the knuckle having a horizontal recess across which the pin passes, a U-bolt fitted slidably in said recess and about the pin, and a yoke slidably fitted on the U-bolt and engaged through the hook coupler and with the sides of the said coupler.

2. In a device of the class described, the combination of an automatic coupling having a knuckle provided with a vertical hole near its free end and a notch or recess in its free end and intersecting said hole, and means for connecting said knuckle with a hook coupling, such connecting means comprising an approximately U-shaped member to enter the notch or recess in the knuckle and a cross member connecting and slidable upon the arms of said approximately U-shaped member, said cross member adapted to engage the hook coupling, and a pin to pass through the vertical hole in the knuckle and through said approximately U-shaped member.

3. In a device of the class described, the combination of an automatic coupling having a knuckle provided with a vertical hole near its free end and a notch or recess in its free end and intersecting said hole, and means for connecting said knuckle with a hook coupling, such connecting means comprising an approximately U-shaped member to enter the notch or recess in the knuckle and a cross member connecting the arms of said approximately U-shaped member, said cross member adapted to engage the hook coupling, said cross member having a reduced intermediate portion whereby stops are provided to be disposed at respective sides of the hook coupling, and a pin to pass through the vertical hole in the knuckle and through said approximately U-shaped member.

In testimony whereof, I have signed this specification in the presence of two subscribing witnesses.

HARRY WALTER STERTZBACH.

Witnesses:
STANLEY JOHNSTON PHENEGER,
LEO G. NOONDRAK.